United States Patent [19]
Edmunds

[11] 3,754,483
[45] Aug. 28, 1973

[54] TRANSMISSION AND CONTROL WITH SHIFT ENGAGEMENT TIMING DEVICES

[75] Inventor: John O. Edmunds, Indianapolis, Ind.

[73] Assignee: General Motors Corporation, Detroit, Mich.

[22] Filed: Nov. 11, 1971

[21] Appl. No.: 197,903

[52] U.S. Cl.............. 74/753, 74/868, 74/DIG. 1, 192/109 F
[51] Int. Cl. ..... F16h 5/18, F16h 57/10, F16d 67/04
[58] Field of Search................. 74/863, 864, 867, 74/868, 869, 753, DIG. 1; 192/109 F

[56] References Cited
UNITED STATES PATENTS

| 3,625,090 | 12/1971 | Chana | 74/869 X |
|---|---|---|---|
| 3,651,714 | 3/1972 | Ohya et al. | 74/867 |
| 3,505,907 | 4/1970 | Fox et al. | 74/753 |
| 3,509,784 | 5/1970 | Mahoney | 74/869 |
| 3,613,484 | 10/1971 | Pierce et al. | 74/869 |
| 3,688,608 | 9/1972 | Leach | 74/753 X |
| 3,691,872 | 9/1972 | Schaefer et al. | 74/869 X |

Primary Examiner—Charles J. Myhre
Assistant Examiner—Thomas C. Perry
Attorney—W. E. Finken, D. F. Scherer et al.

[57] ABSTRACT

A transmission and control in which the transmission has three mechanical gear ratios which are selectively established by the control. The control provides through the use of a plurality of fluid restrictions one engagement time of the intermediate ratio control device during an upshift from the first ratio to the second ratio and another engagement time of the intermediate ratio control device during a downshift from third ratio to second ratio. The control also provides a bypass valve so that the disengagement time of the intermediate ratio control device is not affected by the fluid restrictions during a second to third or second to first ratio change.

8 Claims, 1 Drawing Figure

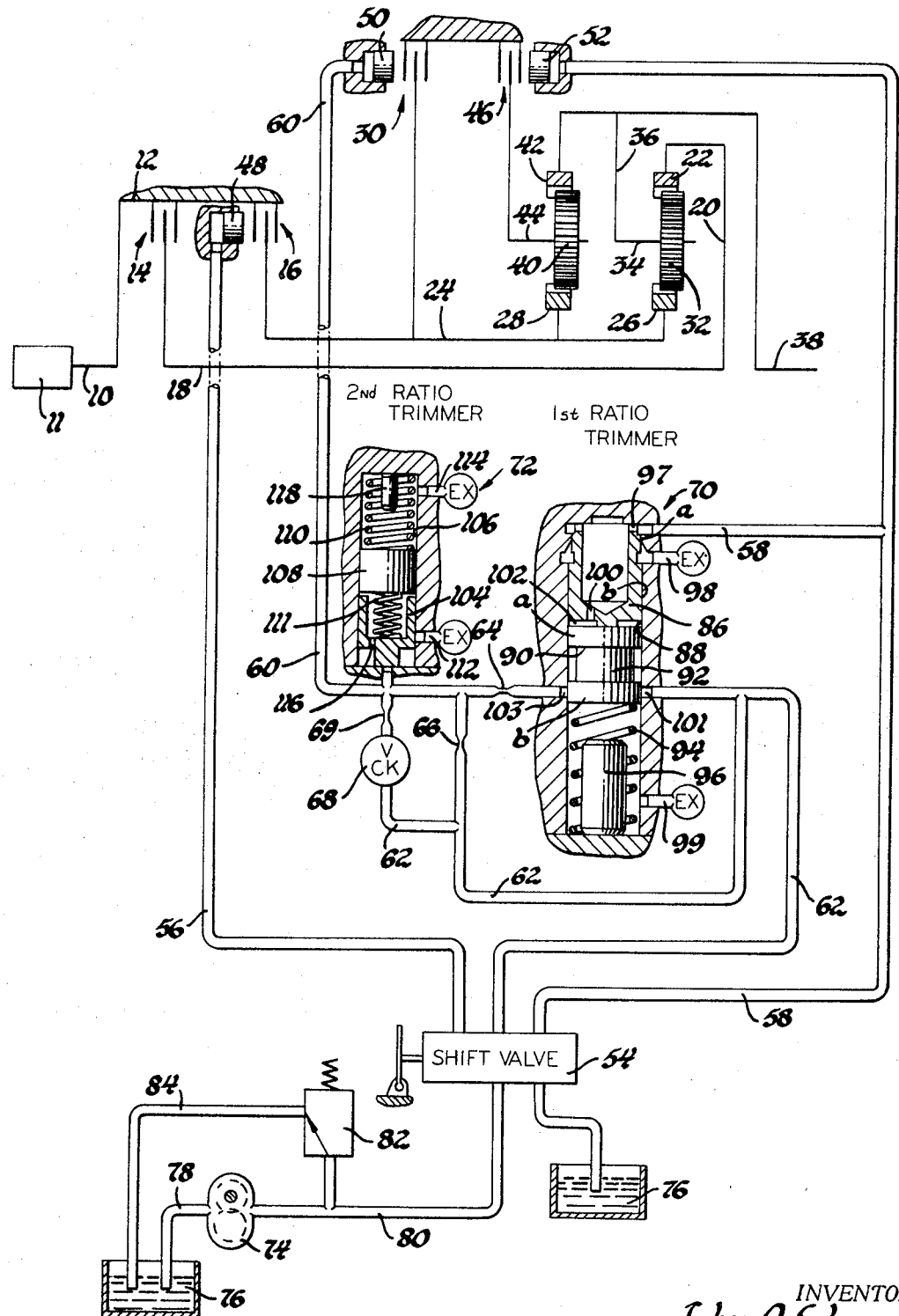

TRANSMISSION AND CONTROL WITH SHIFT ENGAGEMENT TIMING DEVICES

This invention relates to automatic transmissions and controls and more particularly to transmissions and controls wherein the engagement time of one ratio control device is varied.

In a transmission having three or more selectively establishable gear ratios it is desirable to control the engagement time of the intermediate ratios at different values depending upon whether the transmission is upshifting to the intermediate ratio or downshifing to the intermediate ratio. Prior art controls have generally utilized a trimmer valve alone or in combination with a single fluid restriction to control the engagement time of the intermediate ratio. This type of control provides a single engagement time whether an upshift or downshaft to the intermediate ratio is being accomplished. In these types of controls the restriction is therefore a compromise between the ideal engagement times and is therefore not the most desirable.

The present invention in the preferred embodiment utilizes a pair of fluid restrictions which are disposed in parallel flow relationship in the feed passage for the intermediate ratio control device. One of the restrictions is controlled by the trimmer valve which controls the engagement pressure of the low ratio in such a manner that fluid passes through this restriction during a low to intermediate shift change and the restriction is blocked from fluid passage during a third or high ratio to intermediate ratio shift change. The other fluid restriction is continually open in the intermediate engagement passage. Thus, om a low to intermediate shift change both restrictions function to control fluid flow to the intermediate engagement device while on a high to intermediate ratio change only one of the restrictions controls fluid flow to the intermediate ratio control device.

A one way valve such as a check valve is also disposed in the intermediate feed passage in parallel with the fluid restrictions so that on disengagement the intermediate ratio control device is freely open to exhaust.

It is an object of this invention to provide in an improved transmission and control, in which three drive ratios are available, one engagement rate during an upshift to the intermediate ratio and another engagement rate during a downshift to the intermediate ratio.

It is another object of this invention to provide in an improved transmission and control having at least three drive ratios, valve means for controlling the amount of restriction in the intermediate engagement passage to provide less restriction during an upshift to the intermediate ratio than is provided during a downshift to the intermediate ratio.

It is another object of this invention to provide in an improved transmission and control having at least three drive ratios a trimmer valve for the low speed ratio which trimmer valve functions to control the restriction of fluid feed to the intermediate ratio at one level during an upshift to the intermediate ratio and at a second level during a downshift to the intermediate ratio and a bypass control for the restrictions to permit free exhaust of the intermediate ratio during disengagement thereof.

Other objects and advantages of the present invention will be more apparent from the following description and drawing of the preferred embodiment in which is shown in diagrammatic form a three speed transmission and control valving.

Referring to the drawing there is shown a planetary transmission having an input shaft 10 adapted to be driven by a conventional vehicle engine and torque converter 11. The input shaft 10 drives a hub 12 which forms a portion of a forward clutch 14 and a direct-reverse clutch 16. The clutch 14 is drive connected to an intermediate shaft 18 which is drive connected via a hub 20 with a ring gear 22. The clutch 16 is drive connected to another intermediate shaft 24 which is drive connected to a pair of sun gears 26 and 28. The intermediate shaft 24 is also drive connected to an intermediate brake 30.

The sun gear 26 and ring gear 22 are in mesh with a planet gear 32 rotatably mounted on a planet carrier 34 which is connected through a hub 36 to a transmission output shaft 38. The sun gear 28 meshes with a planet gear 40 which also meshes with a ring gear 42 which is also drive connected to the hub 36 and output shaft 38. The planet gear 40 is rotatably mounted on a planet carrier 44 which is drive connected to a low brake 46.

The clutch 16 and brakes 30 and 46 are fluid operated type friction devices which are controlled by pistons 48, 50 and 52 respectively.

During operation of the transmission the clutch 14 and the brake 52 are engaged to provide a first or low gear ratio between the input shaft 10 of the output shaft 38. To establish intermediate or second gear ratio the brake 52 is disengaged while the brake 50 is engaged and the clutch 14 remains engaged. To establish third gear or high ratio the brake 50 is disengaged while the clutch 16 is engaged and the clutch 14 remains engaged. A reverse ratio may be established by engaging clutch 16 and brake 46 while the other clutches and brakes are disengaged.

The pistons 48 and 52 are in fluid communication with a manual shift valve 54 via third clutch speed passage 56 and low brake feed passage 58. The piston 50 of the intermediate brake 30 is in fluid communication with an intermediate feed passage 60 which is in fluid communication with an intermediate engagement passage 62 through a pair of restrictions 64 and 66 and a one way check valve 68 which permits flow from passage 60 to passage 62 through a restriction 69 but prevents reverse flow. The intermediate engagement passage 62 is operatively connected with the shift valve 54. The restriction 64 is controlled in its fluid communication with the intermediate engagement passage 62 by a first ratio trimmer valve, generally designated 70. The intermediate feed passage 60 is also in fluid communication with a second ratio trimmer valve 72.

Fluid pressure for the control system is supplied by a positive displacement fluid pump 74 which draws fluid from a reservoir 76 through an inlet passage 78 and delivers fluid pressure through a main passage 80 to the shift valve 54. Fluid pressure in the main passage 80 is controlled by a conventional pressure regulator valve 82 which bypasses excess fluid from the main passage 80 through passage 84 to the reservoir 76.

The shift valve 54 is shown as a manual type shift control valve which is movable to a plurality of positions to control the level of fluid pressure from the pump 74 to the low brake feed passage 58, the intermediate engagement passage 62 and the third clutch feed passage 56. The shift valve 54 may be similar in construction to the manual shift valve shown in the U.S.

Pat. to Schaefer No. 3,459,071 issued Aug. 5, 1969 or any of the other well known and available shift valve mechanisms. The shift valve 54 can also be replaced by an automatic shift control system such as that shown in the U.S. Pat. to Mahoney No. 3,509,784 issued May 5, 1970 and still be consistent with the present invention.

The first ratio trimmer valve 70 includes a pressure regulator plug 86 having a small diameter land a and a larger diameter land b slidably disposed in a stepped valve bore 88, a bias plug 90 having equal diameter lands a and b and an annular recess portion 92 therebetween, a bias spring 94 and a stop member 96. The valve bore 88 is in fluid communication with the low brake feed passage 58, which supplies fluid to the end of the plug 86 through a passage 97 formed in the plug 86, the intermediate engagement passage 62 through a pair of diametrically opposed ports 101 and 103 and two exhaust passages 98 and 99. In the position shown in land b the bias plug 90 prevents fluid communication between the intermediate engagement passage 62 and the restriction 64.

When the shift valve 54 is moved to provide fluid communication between main passage 80 and the low brake feed passage 58 the fluid pressure is also transmitted to the diameter a of the regulator plug 86 of the first ratio trimmer valve 70. When the pressure is introduced to the trimmer valve 70, the plug 86 will move in the bore 88 against the bias force of spring 94 to permit excess fluid to be exhausted through passage 98. At the same time fluid pressure begins to flow through a restriction 100 in the plug 86 to a chamber 102 between the plugs 86 and 90 to cause plug 90 to move against spring 94. The movement of plug 90 increases the force of spring 94 and the trim pressure increases in proportion. As the plug stops on stop 96 the pressures in 97 and 102 equate and the pressure on the larger area 102 closes the regulating valve 97. The fluid pressure in passage 58 will increase and the plug 90 will move toward the stop 96. The initial movement of plugs 97 and 90 to regulating height, as above, opens passage 62 to restriction 64 through the annular recessed portion 92 between lands a and b and this remains open as long as the first ratio is engaged.

The second ratio trimmer valve 72 has a regulator piston 104 slidably disposed in a valve bore 106, a bias plug 108 also slidably disposed in the valve bore 106, a bias spring 110 compressed between the bias plug 108 and one end of valve bore 106 and a light bias spring 111 between piston 104 and plug 108. The valve bore 106 is in fluid communication with the intermediate feed passage 60 and with two exhaust passages 112 and 114. The regulator piston 104 has a restricted passage 116 which admits fluid between the piston 104 and the plug 108. When the intermediate feed passage 60 is pressurized the regulator piston 104 will move in the bore 106 against the bias spring 110 until the exhaust passage 112 is opened by the piston 104. Also during this time fluid will flow through the restricted passage 106 between piston 104 and plug 108 to move plug 108 against regulator spring 106. As the plug moves against spring 106 the regulated pressure increases until plug reaches stop 118. At this time the force of spring 111 and the pressure bias force between plugs 108 and 104 become grounded on stop 118. These are additives and greater than the regulated pressure bias on plug 104. Thus, the plug 104 moves to shut off regulation and the line 60 pressure immediately rises to equal main pressure.

When the brake 46 is released the regulator plug 86 remains in the position shown and the bias plug 90 will begin to move from the stop 96. The time required for the plug 90 to move is determined by the restriction 100 and the force in spring 94. This time will be longer than the time required to complete the first to second upshift so that the intermediate shift passage 62 will be opened between lands a and b of plug 90 during the upshift.

The second ratio trimmer valve 72 is operable during a 1-2 upshift and a 3-2 downshift. The check valve 68 and restriction 69 permit restricted exhaust of the intermediate brake 30 and cooperates with restriction 66 during a 2-3 upshift and with restrictions 64 and 66 during a 2-1 downshift. The trimmer valve 72 returns to the position shown on a shift from second in preparation for a subsequent shift to second. The restrictions 64, 66 and 69 cooperate to provide more rapid disengagement of the brake 30 during a 2-1 downshift than during a 2-3 upshift. During a 1-2 upshift the first ratio trimmer valve will have been operated to communicate the passage 62 with the restriction 64 between the lands a and b of the plug 90 such that both restrictions 64 and 66 will be available to feed the intermediate feed passage 60 during a 1-2 upshift. During a 3-2 downshift, however, the first ratio trimmer valve 70 will be in the position shown so that the intermediate feed passage 60 will be fed from intermediate engage passage 62 through restriction 66 alone. Therefore, the intermediate brake 30 will be engaged more rapidly during a 1-2 upshift and will be engaged slowly during a 3-2 downshift. This permits the engine to be rapidly decelerated during an upshift and permits the engine to be slowly accelerated during a downshift thus providing more desirable shift timing during the various changes of gear ratios in the transmission.

While the invention described is a transmission having three speed ratios it can be used in transmissions having more than three speed ratios. If, for example, the invention is used with a four speed transmission, the second ratio trimmer valve 72 would be constructed similar to the first ratio trimmer valve 70 so that a pair of restrictions placed in parallel in the third ratio feed line, could be controlled during a 2-3 upshift and a 4-3 downshift. The invention can be expanded to transmissions having more ratios by using restrictions in parallel in the drive establishing device feed lines in the intermediate ratios and utilizing the trimmer valve for the next lower ratio to control fluid flow through the restrictions.

Obviously, many modifications and variations of the present invention are possible in light of the above teachings. It is, therefore, to be understood that within the scope of the appended claims the invention may be practiced otherwise than as specifically described.

What is claimed is:

1. A transmission and control comprising in combination, planetary gearing means; first, second and third fluid operated selectively operable drive ratio establishing means operatively connected with said planetary gearing means for selectively establishing first, second and third drive ratios therein; a source of fluid pressure; shift valve means in fluid communication with said source and said drive ratio establishing means for selectively engaging and disengaging said drive ratio establishing means; first timing control means in series with said shift valve means and said second drive ratio establishing means and operatively connected in fluid communication with said first drive ratio establishing means for controlling the engagement time of said second drive ratio establishing means during the interchange from said first to said second drive ratio establishing means; and second timing control means in parallel with said first timing control means and cooperating therewith for controlling the engagement time of said second drive ratio establishing means during the first to second drive ratio establishing means interchange, and being operable to control the engagement time of said second drive ratio establishing means during the interchange from said third to second drive ratio establishing means; said first timing control means being inoperable during said third to second drive ratio establishing means interchange.

2. A transmission and control comprising in combination, planetary gearing means; first, second and third fluid operated selectively operable drive ratio establishing means operatively connected with said planetary gearing means for selectively establishing first, second and third drive ratios therein; a source of fluid pressure; shift valve means in fluid communication with said source and said drive ratio establishing means for selectively engaging and disengaging said drive ratio establishing means; first restriction means in series with said shift valve means and said second drive ratio establishing means; trimmer valve means for controlling pressure in said first drive ratio establishing means having a member connected in fluid communication with said source and said first restriction means for permitting fluid flow through said first restriction means during the interchange from said first to said second drive ratio establishing means and preventing fluid flow through said first restriction during a third to second drive ratio establishing means interchange; and second restriction means in parallel with said first restriction means and cooperating therewith for controlling the engagement time of said second drive ratio establishing means during the first to second drive ratio establishing means interchange, and being operable to control the engagement time of said second drive ratio establishing means during the interchange from said third to second drive ratio establishing means.

3. A transmission and control comprising in combination, multi-speed drive ratio means for providing low, intermediate and high drive ratios having a plurality of fluid operated means for controlling said drive ratios; a source of fluid pressure; shift valve means for selectively connecting said source with said fluid operated means; a pair of flow restriction means in parallel for controlling fluid flow between said source and said fluid operated means controlling said intermediate drive ratio; and pressure control means for controlling fluid pressure in one of said fluid operated means and including moveable means responsive to fluid pressure in said one of said fluid operated means for controlling flow to said flow restriction means for permitting flow through both said flow restriction means during a low to intermediate drive ratio interchange and for permitting flow through only one of said restriction means during a high to intermediate drive ratio interchange to control the engagement time of said intermediate ratio.

4. A transmission and control comprising in combination, planetary gearing means; first, second and third fluid operated selectively operable drive ratio establishing means operatively connected with said planetary gearing means for selectively establishing first, second and third drive ratios therein; a source of fluid pressure; shift valve means in fluid communication with said source and said drive ratio establishing means for selectively engaging and disengaging said drive ratio establishing means; first timing control means in series with said shift valve means and said second drive ratio establishing means and operatively connected in fluid communication with said first drive ratio establishing means for controlling the engagement time of said second drive ratio establishing means during the interchange from said first to said second drive ratio establishing means; second timing control means in parallel with said first timing control means and cooperating therewith for controlling the engagement time of said second drive ratio establishing means during the first to second drive ratio establishing means interchange, and being operable to control the engagement time of said second drive ratio establishing means during the interchange from said third to second drive ratio establishing means; said first timing control means being inoperable during said third to second drive ratio establishing means interchange; and one way valve means for permitting free exhaust of said second drive ratio establishing means during the second ratio to first ratio interchange and the second ratio to third ratio interchange.

5. A transmission and control comprising in combination, planetary gearing means; first, second and third fluid operated selectively operable drive ratio establishing means operatively connected with said planetary gearing means for selectively establishing first, second and third drive ratios therein; a source of fluid pressure; shift valve means in fluid communication with said source and said drive ratio establishing means for selectively engaging and disengaging said drive ratio establishing means; first restriction means in series with said shift valve means and said second drive ratio establishing means; trimmer valve means for controlling pressure in said first drive ratio establishing means including a regulator valve means for controlling pressure in said first drive ratio establishing means and a valve member having a pair of spaced lands connected in fluid communication between said source and said first restriction means and being movable in response to fluid pressure regulated by the regulator valve means for said first drive ratio establishing means to one position to permit fluid flow between said lands to said first restriction means during the interchange from said first to said second drive ratio establishing means and being movable to another position to align one of said lands with flow from said source to prevent fluid flow to said first restriction during a third to second drive ratio establishing means interchange; and second restriction means in parallel with said first restriction means and cooperating therewith for controlling the engagement time of said second drive ratio establishing means during the first to second drive ratio establishing means interchange, and being operable to control the engagement time of said second drive ratio establishing means during the interchange from said third to second drive ratio establishing means.

6. A transmission and control comprising in combination, planetary gearing means; first, second and third fluid operated selectively operable drive ratio establishing means operatively connected with said planetary gearing means for selectively establishing first, second and third drive ratios therein; a source of fluid pressure; shift valve means in fluid communication with said source and said drive ratio establishing means for selectively engaging and disengaging said drive ratio establishing means; first timing control means in series with said shift valve means and said second drive ratio establishing means for controlling the engagement time of said second drive ratio establishing means during the interchange from said first to said second drive ratio establishing means; trimmer valve means in fluid communication with said source and said first drive ratio establishing means including valve means having a pair of spaced lands and being movable to one position in response to fluid pressure in said first drive ratio establishing means to permit flow between said lands from said source to said first timing control means, and to another position when said first drive ratio establishing means is inoperative to align one of said lands between said source and said first timing control means to prevent fluid flow from said source to said first timing control means; second timing control means in parallel with said first timing control means and cooperating therewith for controlling the engagement time of said second drive ratio establishing means during the first to second drive ratio establishing means interchange, and being operable to control the engagement time of said second drive ratio establishing during the interchange from said third to second drive ratio establishing means; and one way valve means for permitting free exhaust of said second drive ratio establishing means during the second ratio to first ratio interchange and the second ratio to third ratio interchange.

7. A transmission and control comprising in combination; multispeed drive ratio means for providing low, intermediate and high drive ratios and a plurality of fluid operated means selectively operated for establishing said drive ratios; a source of fluid pressure; shift valve means, including low, intermediate and high passage means connected to said fluid operated means, for selectively exhausting and connecting said source to said low, intermediate and high passage means and said fluid operated means to selectively disestablish and establish said low, intermediate and high drive ratios; variable flow restriction means in said intermediate passage means having a low and a high restriction position controlling the time of establishment of said intermediate drive ratio; trimmer regulator valve means operatively connected to another of said passage means having a normal position when said another of said passage means is conditioned to disestablish another drive ratio and operative in response to change of fluid pressure in said another of said passage means to variably regulate the pressure in said another of said passage means for gradual establishment of said another drive ratio while moving to a terminal position and to remain in said terminal position while said another drive ratio remains established and operative during disestablishment of said another drive ratio to slowly move from said terminal position to said normal position and operatively connected to said variable flow restriction means and responsive to said movement between said terminal and normal positions to provide said high restriction during a high to intermediate interchange and said low restriction during a low to intermediate interchange.

8. A transmission and control comprising in combination; multispeed drive ratio means for providing low, intermediate and high drive ratios and a plurality of fluid operated means selectively operated for establishing said drive ratios; a source of fluid pressure; shift valve means, including low, intermediate and high passage means connected to said fluid operated means, for selectively connecting said source to supply fluid to said low, intermediate and high passage means and said fluid operated means to selectively establish said low, intermediate and high drive ratios in a predetermined time period and selectively exhausting fluid from said low, intermediate and high passage means and said fluid operated means to selectively disestablish said low, intermediate and high drive ratios; variable flow restriction means in said intermediate passage means having a low and a high restriction position controlling the rate of flow to and the time of establishment of said intermediate drive ratio; trimmer regulator valve means operatively connected to another of said passage means having a normal position when said another of said passage means is exhausted to disestablish another drive ratio and operative in response to the supply of fluid pressure in said another of said passage means to regulate the pressure in said another of said passage means at gradually increasing pressures for gradual establishment of said another drive ratio while moving to a terminal position and to remain in said terminal position providing full pressure while said another drive ratio remains established and operative on exhaust of pressure in said another passage means for disestablishment of said another drive ratio to slowly move from said terminal position to said normal position in a time period at least as large as said predetermined time period for establishment of said intermediate ratio and operatively connected to said variable flow restriction means and responsive to said movement between said terminal and normal positions to provide said high restriction during a high to intermediate interchange and said low restriction during a low to intermediate interchange.

* * * * *